April 7, 1964     R. F. WOODCOCK     3,128,167
METHOD AND APPARATUS FOR FORMING TAPERED FIBER
OPTICAL IMAGE TRANSFER DEVICES
Filed Nov. 28, 1960     3 Sheets-Sheet 1
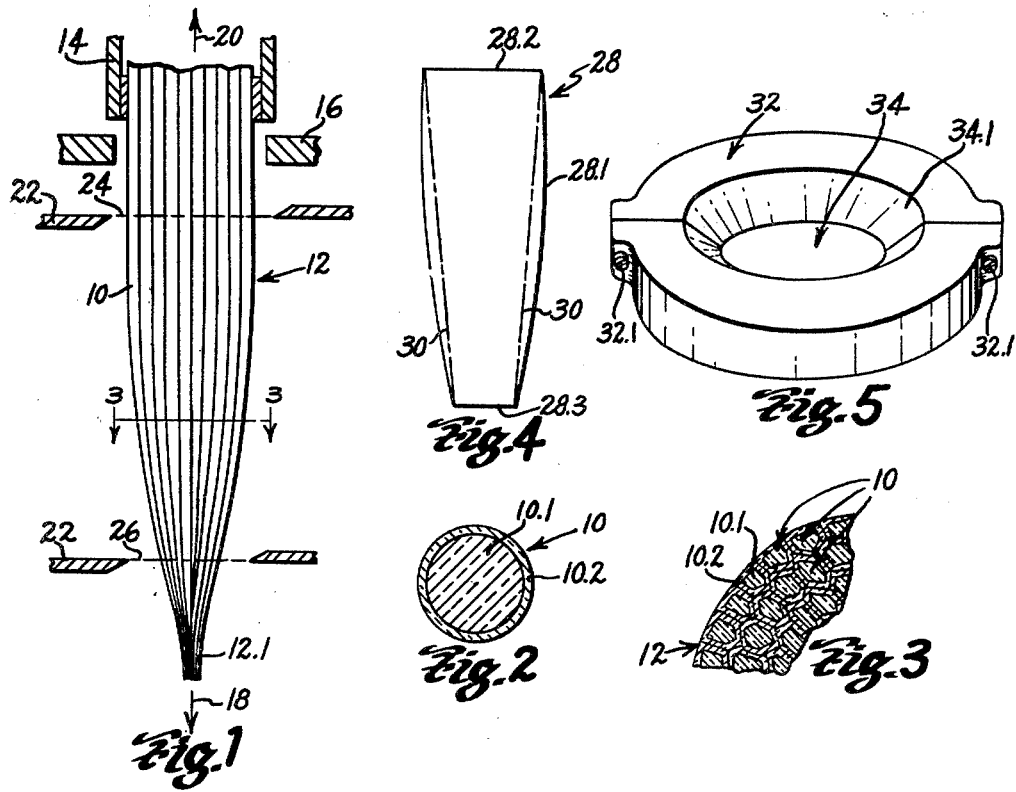
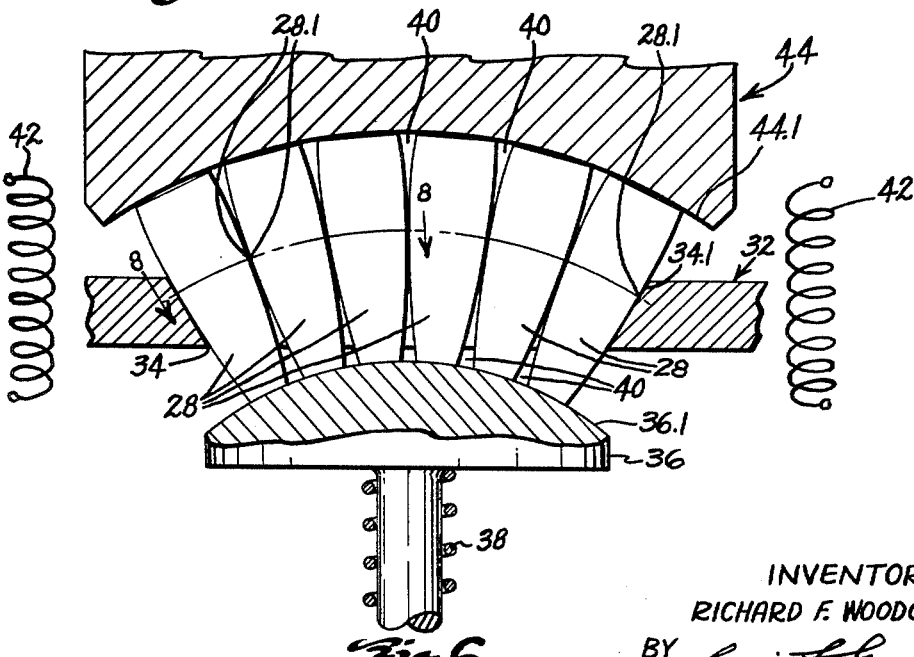
INVENTOR
RICHARD F. WOODCOCK
BY
ATTORNEYS

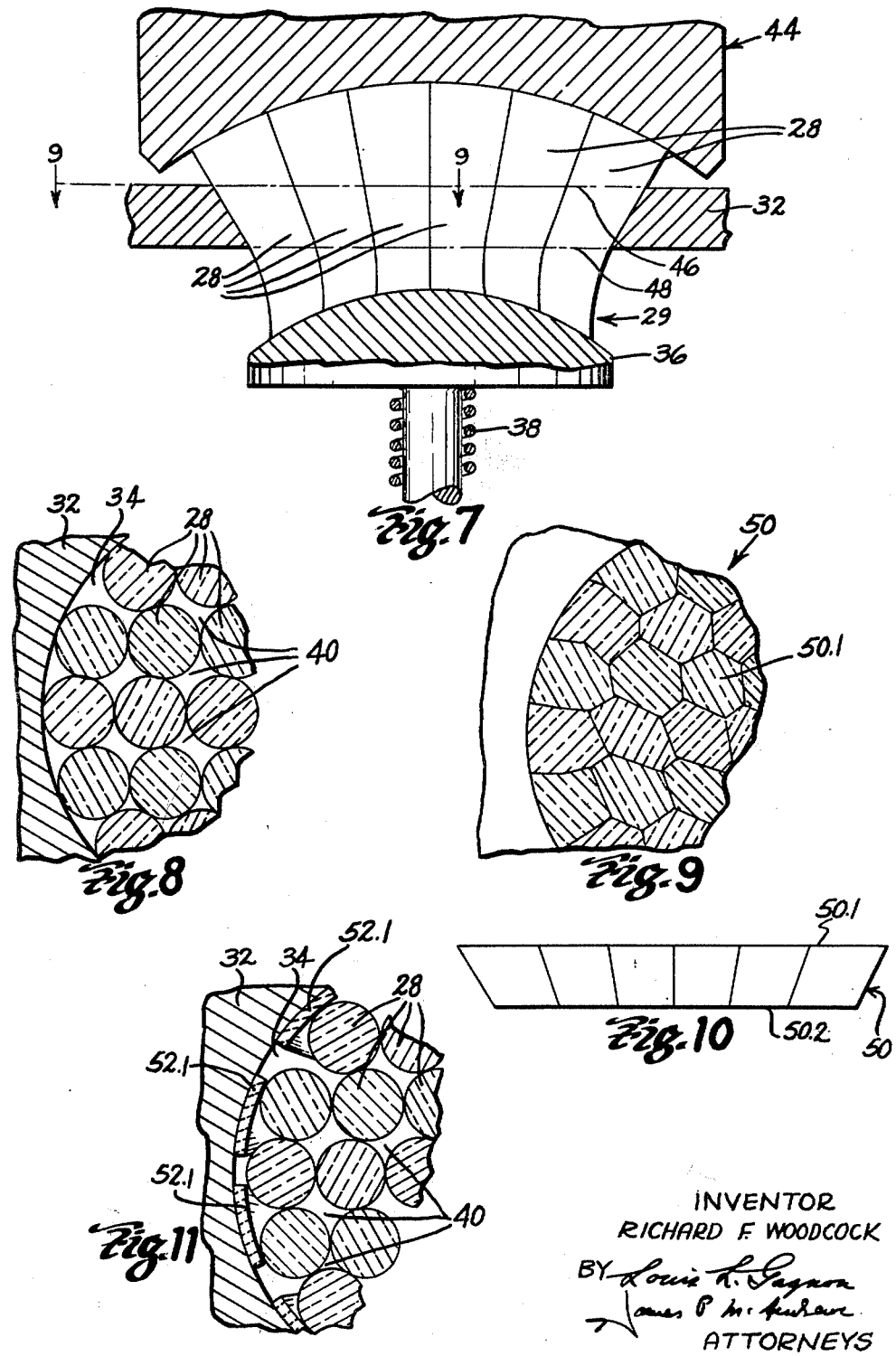

April 7, 1964 R. F. WOODCOCK 3,128,167
METHOD AND APPARATUS FOR FORMING TAPERED FIBER
OPTICAL IMAGE TRANSFER DEVICES
Filed Nov. 28, 1960 3 Sheets-Sheet 3

INVENTOR
RICHARD F. WOODCOCK
BY
ATTORNEYS

United States Patent Office 3,128,167
Patented Apr. 7, 1964

3,128,167
METHOD AND APPARATUS FOR FORMING TAPERED FIBER OPTICAL IMAGE TRANSFER DEVICES
Richard F. Woodcock, South Woodstock, Conn., assignor to American Optical Company, Southbridge, Mass., a voluntary association of Massachusetts
Filed Nov. 28, 1960, Ser. No. 72,189
10 Claims. (Cl. 65—36)

The field of this invention is that of tapered fiber-optical image-transfer devices such as might be used in magnifying and demagnifying optical images, and the invention relates, more particularly, to novel and improved methods and apparatus for manufacturing such devices.

Tapered fiber-optical image-transfer devices are well known and have frequently been used as image-magnifying or demagnifying faceplates in cathode-ray tubes and the like, each such device embodying a plurality of tapered light-conducting fibers which are usually fused together in side-by-side, vacuum-tight relation. In such devices, each fiber is adapted to receive light at one end from a portion of an optical image projected upon one end of the device and is adapted to conduct said light therethrough for reproducing said image portion at the other end of the device, the difference in cross-sectional area of the tapered fibers at opposite ends thereof providing magnification or demagnification of respective image portions so that the fibers cooperate to magnify or demagnify the entire image. At the present time, tapered image-transfer devices of this sort are prepared by heating one end of a bundle of light-conducting fibers to a fusing temperature and by drawing the bundle from said end at selected speed so that a section of the bundle is tapered as a whole for tapering individual fibers within the section and for fusing the fiber together within said section. However, the tapered faceplates and the like which can be formed by this method are relatively limited in size in that the uniform heating of a localized area of a fiber bundle in the manner required for drawing a tapered bundle section is difficult or impossible to achieve throughout a bundle of relatively large cross-sectional area.

It is an object of this invention to provide novel and improved methods and apparatus for forming tapered fiber-optical image-transfer devices; to provide methods and apparatus for forming such devices which are of relatively large cross-sectional area; to provide methods and apparatus for forming such devices by securing a plurality of smaller, individually-tapered members in side-by-side bundled relation; to provide methods and apparatus for forming such devices by fusing a plurality of smaller, individually-tapered image-transfer members in side-by-side bundled relation without entrapment of air bubbles and the like between said smaller members; to provide methods and apparatus for forming such devices which are of relatively large cross-sectional area in which individual light-conducting members embodied in the devices are adapted to provide substantially the same degree of image magnification and demagnification over the entire cross-sectional area of the device; to provide methods and apparatus for economically forming tapered fiber-optical image-transfer devices; and to provide such method and apparatus by which said devices can be rapidly and conveniently manufactured.

Briefly described, the novel and improved method provided by this invention for forming tapered fiber-optical image-transfer devices includes the step of providing a plurality of light-conducting members each of which has a slight convexity or entasis intermediate its ends. That is, one step of said method comprises the provision of a plurality of light-conducting members, preferably of tapered configuration, which are of selected cross-sectional areas at opposite ends and which have respective portions intermediate their ends of a cross-sectional area larger than would be found in straight-sided or straight-tapered members having ends of said cross-sectional areas. The light-conducting members can comprise individual light-conducting rods or fibers having respective light-insulating coatings, but preferably comprise multifibers or small fiber bundles embodying a multiplicity of light-conducting fibers having respective light-insulating coatings which are fused together in vacuum-tight relation. For example, in the preferred method of this invention, there is provided a plurality of identical, tapered, light-conducting members each embodying a multiplicity of tapered light-conducting fibers having respective light-insulating coatings which are fused together in side-by-side bundled relation, each of said members having an end of relatively large cross-sectional area and an opposite end of relatively small cross-sectional area and tapered therebetween at a rate of taper which increases at least at one point intermediate said ends.

Another step of the method of this invention comprises the provision of a mold having a tapered recess or aperture therein, the mold recess or aperture preferably tapering downwardly and inwardly. The light-conducting members are assembled in side-by-side relation within the mold recess or aperture to form a bundle in which adjacent light-conducting members initially contact each other at points of said convexity and in which peripheral members in the bundle initially contact tapered portions of the mold at points of said convexity. In this arrangement, the light-conducting members can form a self-supporting dome extending across the mold recess or aperture, each of the members being supported by line or point contact of points of convexity on said member with similar points of convexity of adjacent members or with tapered portions of the mold.

According to this method, the light-conducting members can be heated to a fusing temperature within said mold recess or aperture. In one embodiment of the method of this invention, the light-conducting members can be heated to a relatively high fusing temperature for causing at least some of the members to sag further into the mold recess in the direction of the recess taper so that the members are first fused together at said points of initial contact, that is at said points of convexity, and are then fused together progressively along the lengths of the members from said points of convexity. In this arrangement, progressive fusing of the members outwardly from points of initial contact tends to sweep air and other gases from between the members and prevents the formation and entrapment of air bubbles and the like between the fused members. In an alternative embodiment of the method of this invention, the light-conducting members assembled within the mold aperture can be heated to a fusing temperature, preferably slightly lower than described above, and axial pressure can be applied to the members for moving the members further into the mold recess or aperture in the direction of the mold taper. In this arrangement, the members are also initially fused together at points of said convexity and are then fused together progressively along the lengths of the members from said points of convexity. In a further alternative embodiment of the method of this invention, the light-conducting members assembled within the mold aperture can be secured together adjacent the smaller end of the mold recess or aperture and can be drawn further into the mold aperture for also fusing said members together in the manner above described.

After fusing the light-conducting members into an integrated unit, the unit can be permitted to cool and can be cut transversely of the members at each end of the unit, if desired, for forming light-receiving faces thereon, and said faces can be optically finished for rendering them readily receptive to light.

The novel and improved apparatus provided by this invention includes a mold having a tapered recess or aperture therein, the mold recess or aperture preferably extending downwardly and inwardly and being adapted to receive a plurality of light conducting members therein. The apparatus preferably also includes a support which is adapted to extend across at least a substantial part of said mold recess or aperture for engaging light-conducting members which are inserted within the mold recess or aperture through the larger end thereof, the support preferably being adapted to be retracted from said engagement. Alternatively, the support can be resiliently mounted to be adapted for movement in the direction of said mold taper when pressure is applied thereto. The apparatus also includes means for heating the light-conducting members within the mold, and preferably includes means for forcing the members to move further into the mold aperture. For example, said means for forcing the members to move into the aperture can comprise means for applying axial pressure to the light-conducting members for pressing the members into the mold recess in the direction of the mold taper or can comprise means for drawing the members further into the mold recess.

In this arrangement, a plurality of light-conducting members each of which has a slight convexity intermediate its ends can be inserted within the mold recess or aperture in side-by-side relation to be engaged and to be supported by the support extending across the aperture. When a sufficient number of said members has been inserted within the recess to form a bundle which substantially fills the aperture, the members can be arranged so that adjacent members in the bundle contact each other at points of said convexity and so that peripheral members in the bundle contact tapered portions of the mold at points of said convexity, thereby to form a self-supporting dome of members extending across the aperture. The support can then be retracted from engagement with the light-conducting members if desired. Then the members can be heated to a fusing temperature so that the members tend to sag into the mold recess, and, if desired, axial pressure can be applied to the members for pressing the members further into the mold recess or the members can be drawn further into the mold aperture, whereby the members will be first fused together at said points of convexity and then will be fused together progressively along the lengths of said members from said points of convexity. If desired, where the support is resiliently mounted and is adapted to move in the direction of the mold taper when pressure is applied thereto, the support can be permitted to remain in engagement with said members as the members are permitted to sag or as axial pressure is applied to the members, the support tending to maintain the dome-like arrangement of the members during fusing thereof.

In an alternative embodiment of the apparatus of this invention, there is provided a lining for the mold recess, said lining embodying a plurality of segments of mica or other suitable material, preferably of the refractory type, which are adapted to move within the mold recess or aperture in the direction of the mold taper even when the mold and lining are heated to relatively high temperatures. When this lining is positioned within the mold recess or aperture before light-conducting members are positioned therein the lining segments will contact peripheral portions of the bundle of light-conducting members. Then when the members are heated and caused to move further into the mold recess, the lining segments will slide within the recess without tending to stick to the mold, thereby facilitating fusing of the members together.

Other objects and advantages of the methods and apparatus provided by this invention will appear in the following detailed description of said methods and apparatus, said detailed description referring to the drawings in which:

FIG. 1 is a diagrammatic view illustrating the formation of a tapered light-conducting member utilized in the method provided by this invention;

FIG. 2 is an enlarged transverse section view of a light-conducting fiber embodied in the light-conducting member of FIG. 1;

FIG. 3 is a partial section view along line 3—3 of FIG. 1;

FIG. 4 is a side elevation view of the light-conducting member of FIG. 1;

FIG. 5 is a perspective view at reduced scale of a mold utilized in the method of this invention;

FIG. 6 is a partial vertical section view of the apparatus of this invention illustrating a step in one embodiment of the method of this invention;

FIG. 7 is a view similar to FIG. 6 illustrating a subsequent step in the method shown in FIG. 6;

FIG. 8 is a partial section view along line 8—8 of FIG. 6;

FIG. 9 is a partial section view along line 9—9 of FIG. 7;

FIG. 10 is a side elevation view of the device provided by the method illustrated in FIGS. 1–9;

FIG. 11 is a view similar to FIG. 8 illustrating an alternative embodiment of the apparatus of this invention;

Figure 12:
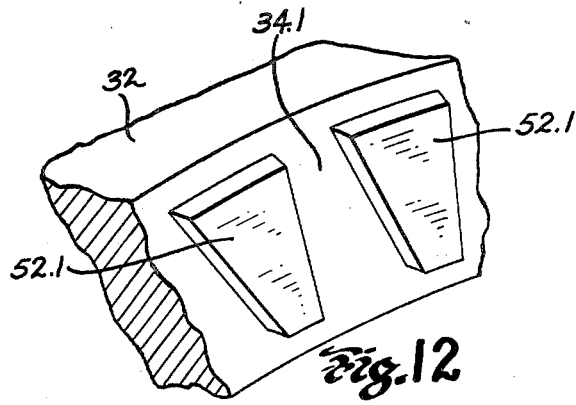
FIG. 12 is a partial perspective view of the apparatus shown in FIG. 11.

Tapered fiber-optical image-transfer devices have been formed prior to this invention in the manner illustrated in FIG. 1. As shown, a multiplicity of light-conducting fibers 10 can be assembled in side-by-side parallel relation to form a bundle 12, each fiber 10 embodying a light-conducting core 10.1 of a light-transmitting material such as flint glass or the like of relatively high index of refraction and a light-insulating coating 10.2 of a light-transmitting material such as crown or soda-lime glass or the like of relatively low index of refraction (see FIG. 2), whereby each fiber 10 can be adapted to conduct light from end to end thereof in accordance with well known principles of total internal reflection. The fiber bundle 12 can then be secured in a supporting clamp 14 and can be held suspended through a ring-shaped heating element 16 of any conventional type. When a localized portion of the fiber bundle has been heated to a fusing temperature at the end 12.1 of the bundle, the bundle can be drawn or elongated in the direction of the arrow 18. At the same time, air and other gases can be drawn from between the fibers in the bundle by any conventional means as indicated by the arrow 20. By regulation of the fusing temperature and the speed at which the fiber bundle is drawn, the bundle can be provided with a tapered section 12.1 of desired configuration in well known manner, the tapered section being either convex, as shown, or concave, if desired. As the fiber bundle is drawn, each fiber embodied in the bundle will be individually tapered and will be fused to adjacent fibers in the bundle, the fibers and coatings retaining their relative proportions and individual identities as shown in FIG. 3 so that each fiber in the tapered section of the bundle will also be adapted to conduct light from end to end thereof by total internal reflection. The fiber bundle 12 is permitted to cool and cutters 22 of any conventional type can then be utilized for cutting through the fiber bundles 12 as at 24 and 26 for forming a fused and tapered fiber optical image-transfer device 28 as shown in FIG. 4.

According to the method of this invention, there is provided a plurality of light-conducting members which are similar to and which are preferably identical to the tapered light-conducting members 28 as shown in FIG. 4, each member having a slight convexity or entasis as at 28.1 intermediate its ends. That is, as shown in FIG. 4, the ends of the members can be of selected cross-sectional area as at 28.2 and 28.3 and must have a portion intermediate its ends which is of larger cross-sectional area than would be found in a similar but straight-sided or straight-tapered member having ends of the same cross-sectional area. In FIG. 4, for example, the broken lines 30 indicate the lateral configuration of a straight-tapered member having ends 28.2 and 28.3 whereas 28.1 indicates a slightly convex portion of the member 28 which is of relatively larger cross-sectional area than would be found at a corresponding point of such a straight-sided member. The illustrated convexity in the member 28 is exaggerated for the purpose of illustration, only a very slight degree of convexity being required in this invention. It will be noted that the member 28 tapers from the end 28.2 to the end 28.3 but that the rate of taper increases at 28.1 to form said convexity or entasis.

It should be noted that the light-conducting members utilized in this invention can be of round, hexagonal or other desired cross-sectional configuration and can embody one or a great multiplicity of fibers 10 within the scope of this invention. Further, the ends of the members as at 28.2 and 28.3 of the member 28 can be of the same or of different cross-sectional area and can be made in any desired manner providing that said members have the described convexity or entasis. Thus such members can be barrel-shaped, partially straight-sided and partially tapered, as well as of changing taper as illustrated in FIG. 4. Preferably, the light-conducting members are substantially hexagonal in cross-section and embody a multiplicity of light-conducting fibers 10. Further it is preferred that the members are tapered in a manner similar to that of the members 28. However, since the light-conducting members 28 can be illustrated with greatest clarity, the members 28 will be described herein and it will be understood that other members of similar configuration as above described are within the scope of this invention.

According to the method of this invention, there is also provided a mold 32 having a tapered recess or aperture 34 therein, the mold recess or aperture preferably extending downwardly and inwardly as illustrated in FIG. 5. The mold can be formed of suitable metal as illustrated or can be formed of a suitable refractory material or the like which is adapted to hold its configuration at high temperatures. Where formed of metal, the mold material should be selected to have a coefficient of thermal expansion lower than that of the materials used in the members 28. If desired, the mold can be formed in two parts, as shown, which are held in assembled relation by screws 32.1. As shown in FIG. 6, the light-conducting members 28 are inserted in side-by-side relation within the mold recess or aperture 34. If desired, a support 36 can be positioned to intercept or engage the members until such time as the mold aperture is filled and the support is no longer required as explained below. Preferably, the support has a curved surface 36.1 as shown for engaging the light-conducting members and if desired, can be resiliently mounted upon a spring 38 as shown or otherwise adapted to be retracted from its original position extending across at least a substantial part of the mold aperture. As the members 28 fill the mold aperture and form a bundle therein, the adjacent members in the bundle are adapted to contact each other at points of convexity of the members, as at the points 28.1 previously described. Further, peripheral members of the bundle are also adapted to engage tapered portions 34.1 of the mold at said points of convexity 28.1. In this arrangement, the members are adapted to form a self-supporting dome-like configuration extending across the mold aperture and interstices 40 between the members have a generally wedge-shaped configuration as shown in FIG. 6 becoming generally larger in cross-section near the ends of the members 28. In addition, the general overall configuration of the member bundle within the mold aperture is tapered. As will be understood the support 36 can be retracted from engagement with the members 28 in any conventional manner without disturbing the position of the members in the mold aperture once the dome-like arrangement of the members has been established.

The members 28 within the mold aperture are then heated to a fusing temperature by any conventional means as is diagrammatically represented in FIG. 6 by heating coils 42. For example, where the light-conducting members 28 embody fibers 10 of flint glass and soda-lime glass as suggested above, the members can be heated to a temperature of approximately 1175° F. Of course, where other materials are used in the fibers 10, the appropriate fusing temperature can be selected therefor. Then, if desired, a plunger member 44, comprising the press member of a conventional arbor press, for example, or other suitable pressure applying means, can be brought to bear against the ends 28.2 of the light-conducting members to apply an axial pressure to the members for forcing them to move further into the mold aperture 34 at least to a slight extent. Where the members 28 are identical in length as well as in other physical dimensions so that the line of contact between the members tends to define a segment of a sphere and so that the ends 28.2 of the members also define a corresponding segment of a sphere, the end 44.1 of the plunger member can be spherical in shape as shown to contact all of the members 28 with equal pressure. However, any other well known pressure applying means could be utilized for applying substantially equal axial pressure to the members 28. Where the members 28 embody fibers 10 of flint glass and soda-lime glass as suggested, an axial force of about 200 pounds per square inch should be applied thereto for effecting proper fusion of the members.

As the members 28 move slightly within the mold aperture, a force is applied to each of the members along the line between points of contact of the members so that the members are first fused together at said points of contact, that is, at points 28.1 of convexity of the members. Then the members are fused together progressively outward along the lengths of the members until the members are fused together throughout their lengths. As the members 28 are fused progressively outward from points of initial contact, the interstices 40 between the members are gradually closed for sweeping air and other gases from between the fibers, thereby to prevent entrapment of air bubbles and the like between the members and to assure that the members are fused in vacuum-tight relation to form the integrated unit shown in FIG. 7. Where the support 36 is spring mounted as shown, it can be adapted to be forced downwardly by movement of the members 28 during fusing of the members. Thus the support need not be retracted but can be adapted to maintain the members 28 in proper relation to each other during fusing of the members. In this case, the ends 28.3 of the members may tend to flare a bit as shown at 29 in FIG. 7.

Alternatively, where the support 36 has been retracted from engagement with the members 28 prior to fusing of the members, the members can be heated to a slightly higher fusing temperature so that some of the members 28, particularly those near the center of the mold aperture 34, will tend to sag further into the mold aperture without the application of axial pressure to the members by the plunger 44. For example, where the light-conducting members 28 embody fibers 10 of flint glass and soda-lime glass as suggested above, the members can be heated to a temperature of approximately 1225° F. In this case, the members 28 wil also be fused together at said points of initial contact and will then be fused together progressively outward along the lengths of the members as above described. If desired, the resilient mounting of the support 36 can be adjusted in any conventional manner after the members 28 are arranged to be self-supporting so that only light pressure is required for depressing the support. For example, the spring 38 could be adjusted downwardly to reduce the force required for depressing the support. Then the support could be permitted to remain in engagement with the members 28 as they are sagged into fused relation, thereby to aid in holding the members in the proper relation to each other during fusing.

Thereafter, the integrated unit formed of the members 28 can be cut transversely of the members 28 adjacent each end of the unit. For example, the unit can be cut along lines 46 and 48 as shown in FIG. 7 to form the tapered fiber-optical image-transfer device 50 shown in FIGS. 9 and 10. Then the faces 50.1 and 50.2 of the device can be abraded and polished in conventional manner for optically finishing the fibers 10 which terminate in said faces for rendering the fibers readily receptive to light. It will be noted that the ends of the members 28 which appear in FIG. 9 are shown as single pieces of glass for convenience of illustration. However, it should be kept in mind that each of said members preferably embodies a plurality of light-conducting fibers 10 as above described. Although the integrated unit formed of the members 28 has been cut in parallel planes to provide a device 50 having planar faces 50.1 and 50.2, it will be understood that these faces could be spherical or could be of other curvilinear configuration if desired.

It will be noted that the mold 32 has been described as formed of metal, refractory material or other suitable material which is adapted to retain its shape under high temperatures. Where the mold is formed of metal, it may be that the members 28 will tend to adhere to the mold during fusing of the members. For this reason, a lining 52 of mica or other suitable refractory material is preferably disposed within the mold aperture 34 between the mold itself and the members 28 disposed therein as shown in FIGS. 11 and 12, the lining being adapted to slide against the mold even at relatively high temperatures. The lining is preferably divided into segments 52.1 as shown in FIGS. 11 and 12 so that the segments are adapted to move in the direction of the mold taper during fusing of the members 28. Thus, as will be readily understood, when the members 28 are moved within the mold aperture during fusing of the members as described above, the segments 52.1 may adhere to the members being fused, but, since the segments will slide against the mold even at high temperatures, movement of the peripheral members 28 will not be retarded. Further, after fusing of the members 28 has been completed, the integrated unit formed of the members can be removed from the mold without tending to stick to the mold. Then the lining segments 52.1 can be peeled from the periphery of the integrated unit. Of course, the illustrated lining segments 52.1 need not be spaced as shown but can be scarfed in overlapping relation or otherwise adapted to permit movement of the members in the direction of the mold aperture taper.

In the embodiments of the method of this invention above-described, it was said that the light-conducting members 28 were preferably identical for facilitating assembly and fusing of the members. However, when the integrated unit formed from such members is cut at 46 and 48 as shown in FIG. 7 to provide a tapered device 50 having planar faces 50.1 and 50.2, it can be seen that, since the portions of the members 28 embodied in the periphery of the device 50 are cut at a more oblique angle, the cross-sectional area of the member portions, and of the fiber lengths 10 embodied in said member portions, which terminate in the device faces 50.1 and 50.2 will be larger than the corresponding areas of member portions and fibers terminating in the center of the device faces. Thus, when an optical image is projected upon the device face 50.2, for example, so that light from portions of the image is conducted through respective tapered fibers 10 to reproduce said image portions in magnified relation on the device face 50.1, the greater light-receiving areas on the ends of fibers 10 terminating at the periphery of the face 50.2 will provide less resolution in the image portions reproduced at the periphery of the device face 50.1 than is achieved by fibers located at the center of the device faces as will be understood. In forming the light-conducting members 28, for example, which are to be ultimately located at the periphery of the device 50, the fibers 10 embodied therein can be of smaller diameter than the fibers embodied in the light-conducting members to be located near the center of the device 50 whereby, although the fibers in these members terminate in the member end faces at relatively oblique angles, the cross-sectional areas of the fibers terminating in corresponding faces of all the members can be approximately equal. In this arrangement, the device 50 will be adapted to transmit all portions of an image projected upon one device face with substantially the same degree of resolution.

Figure 13:
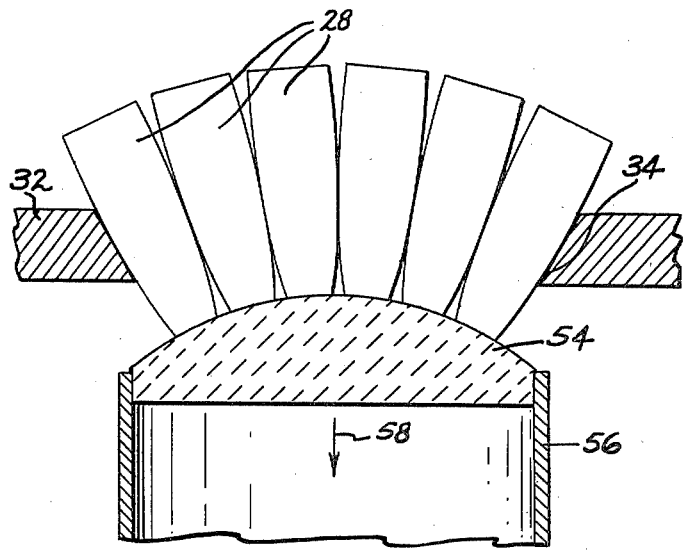
FIG. 13 is a view similar to FIG. 6 illustrating an alternative embodiment of the method and apparatus of this invention.

An alternative embodiment of the method and apparatus provided by this invention is illustrated in FIG. 13. As illustrated, there is provided a mold 32 having a tapered mold aperture 34. There is also provided a plurality of light-conducting members 28 which are assembled within the mold aperture in the manner described above with reference to FIG. 6, whereby the members form a self-supporting dome-like structure extending across the mold aperture. The light-conducting members 28 are then heated to a fusing temperature and are drawn further into the mold aperture so that the members are first fused together at contacting points of convexity of the members and are then fused together progressively outward along the lengths of the members from said points of convexity. For example, a support 54 preferably of a porous refractory material such as is disclosed in U.S. Patents No. 2,440,187 and No. 2,764,491 is mounted beneath the mold aperture for engaging and supporting members 28 inserted within the mold aperture. The support 54 is connected to any suitable vacuum pump means 56 by means of which a suction force can be applied to the member 28 through the porous support as indicated by the arrow 58. The members 28 can be then heated to a fusing temperature as above described so that material from the members 28 will tend to flow within pores of the support 54, particularly under said suction force, to adhere the members to the support. The support can then be moved in the direction of the arrow 58 for drawing the members 28 further into the mold aperture to fuse the members together in an integrated unit in the manner above described. The integrated unit thus formed from the members 28 can then be cut and polished in the manner previously described for forming a tapered fiber-optical image-transfer device 50. Of course any other suitable means for drawing the members further into the mold aperture is within the scope of this invention.

Although particular embodiments of the methods and apparatus of this invention have been described for illustration, it should be understood that the invention includes all modifications and equivalents thereof which fall within the scope of the appended claims.

Having described my invention, I claim:

1. A method of forming a tapered fiber-optical image-transfer device comprising the steps of providing a plurality of light-conducting members each of which has a slight convexity intermediate its ends, assembling said members in side-by-side relation to form a bundle in which adjacent members contact each other at points of said convexity, enclosing at least part of the periphery of said bundle for initially contacting those members at the periphery of said bundle at least at points of said convexity and for defining a section of said bundle which tapers inwardly from points of said convexity, heating said members to a fusing temperature, and causing at least some of said members to move in the direction of said taper for compacting said members into intimately fused relation progressively along the lengths of said member from points of said convexity.

2. A method of forming a tapered fiber-optical image-transfer device comprising the steps of providing a plurality of light-conducting members each of which has a slight convexity intermediate its ends, providing a mold having a tapered recess therein, assembling said members in side-by-side relation within said recess to form a bundle in which adjacent members contact each other at least at points of said convexity and in which those members at the periphery of said bundle initially contact tapered portions of said mold at least at points of said convexity, heating said members to a fusing temperature, and causing at least some of said members to move in the direction of said recess taper for compacting said members into intimately fused relation progressively along the lengths of said members from points of said convexity.

3. A method of forming a tapered fiber-optical image-transfer device comprising the steps of providing a plurality of tapered light-conducting members each of which has a slight convexity intermediate its ends, providing a mold having a recess therein which tapers downwardly and inwardly, assembling said members in side-by-side relation within said recess to form a bundle in which adjacent members contact each other at least at points of said convexity and in which those members at the periphery of said bundle initially contact tapered portions of said mold at least at points of said convexity, and heating said members to a fusing temperature sufficient to permit at least some of said members to sag downwardly within the mold recess for compacting said members into intimately fused relation progressively along the lengths of said members from points of said convexity.

4. A method of forming a tapered fiber-optical image-transfer device comprising the steps of providing a plurality of identical light-conducting members each of which embodies a multiplicity of light-conducting fibers having light-insulating coatings disposed in fused side-by-side relation, said members each having a slight convexity intermediate its ends, providing a mold having a tapered recess therein, assembling said members in side-by-side relation within said recess to form a bundle in which adjacent members contact each other at least at points of said convexity and in which those members at the periphery of said bundle initially contact tapered portions of said mold at least at points of said convexity, heating said members to a fusing temperature, causing at least some of said members to move in the direction of said recess taper for compacting said members into intimately fused relation, progressively along the lengths of said members from points of said convexity, and optically finishing the ends of said members for rendering them readily receptive to light.

5. A method of forming a tapered fiber-optical image-transfer device comprising the steps of providing a plurality of identical, elongate, light-conducting members each of which tapers from a relatively large cross-sectional area at one end toward a relatively small cross-sectional area at the opposite end at a rate of taper which increases at least at one point intermediate said ends, providing a mold having a tapered recess therein, assembling said members in side-by-side relation to form a bundle with at least said opposite member ends extending into said recess so that adjacent members contact each other at points at which the rate of taper of said members increases and so that those members at the periphery of said bundle initially contact tapered portions of said mold at least at points at which the rate of taper of said members increases, heating said members to a fusing temperature, causing at least some of said members to move in the direction of said recess taper for compacting said members into intimately fused relation progressively along the lengths of said members from said points of changing rate of taper, permitting said members to cool for forming an integrated unit cutting transversely through said members adjacent the ends thereof for forming planar faces on the ends of said unit, and optically finishing said faces for rendering them readily receptive to light.

6. The method of forming a tapered fiber-optical image-transfer device comprising the steps of providing a plurality of identical elongate, light-conducting members each of which has a slight convexity intermediate its ends, providing a mold having a tapered recess therein, assembling said members in side-by-side relation within said recess to form a bundle in which adjacent members contact each other at points of said convexity and in which those members at the periphery of said bundle initially contact tapered portions of said mold at points of said convexity, thereby to form a dome-like assembly of the members for supporting said members within said recess, heating said members to a fusing temperature, simultaneously applying axial pressure to said members for forcing the members into said mold recess to compact said members into intimately fused relation progressively along the lengths of said members from points of said convexity, permitting the members to cool for forming an integrated unit, cutting the unit transversely of the member axes adjacent each end of the unit for forming planar faces at each end of the unit, and optically finishing said faces for rendering them readily receptive to light.

7. A method of forming a tapered fiber-optical image-transfer device comprising the steps of providing a plurality of light-conducting members each of which has a slight convexity intermediate its ends, assembling said members in side-by-side relation to form a bundle in which adjacent members contact each other at points of said convexity, enclosing at least part of the periphery of said bundle for initially contacting those members at the periphery of said bundle at least at points of said convexity and for defining a section of said bundle which tapers inwardly from said points of convexity, heating said members to a fusing temperature, applying a squeezing force to said members in such a manner that the members are first fused together at points of said convexity and are then fused together progressively along the lengths of the members from said points of convexity.

8. A method of forming a tapered fiber-optical image-transfer device comprising the steps of providing a plurality of tapered light-conducting members each of which has a slight convexity intermediate its ends, providing a mold having a tapered recess therein, assembling said members in side-by-side relation within said recess to form a bundle in which adjacent members contact each other at points of said convexity and in which those members at the periphery of said bundle initially contact tapered portions of said mold at points of said convexity, thereby to form a dome-like assembly of said members across said recess, heating said members to a fusing temperature, simultaneously drawing said members further into said recess to compact said members into intimately fused relation progressively along the lengths of said members from said points of convexity, permitting the members to cool for forming an integrated unit, cutting the unit transversely of the members adjacent each end of said unit for forming light-receiving faces thereon, and optically finishing said faces for rendering them readily receptive to light.

9. Apparatus for fusing a plurality of tapered light-conducting fiber-optical members together in side-by-side bundled relation to form a tapered fiber-optical image-transfer device, said apparatus comprising a mold having an aperture extending vertically therethrough, said aperture having walls which taper inwardly from top to bottom for receiving said tapered fiber members in side-by-side bundled relation therein to form a self-supporting dome of said members extending across said aperture between said aperture walls, a support extending beneath said mold aperture for engaging fiber members individually inserted into said aperture and for temporarily supporting said members in said aperture until said dome of members has been formed, said support being retractable from its position beneath said aperture for permitting subsequent movement of said dome of members downwardly in said aperture, and means heating said fiber members to a deforming and fusing temperature within said mold aperture so that said fiber members can move downwardly in said aperture to be compressed together into intimately fused relation to each other.

10. Apparatus as set forth in claim 9 further comprising means forcing said self-supporting dome of fiber members downwardly in said mold aperture after the fiber members in said dome have been heated to fusing temperature, thereby to compress said fiber members into intimately fused vacuum-tight relation to each other.

References Cited in the file of this patent

UNITED STATES PATENTS

| | | |
|---|---|---|
| 199,583 | Siemens | Jan. 22, 1878 |
| 1,868,863 | Watson et al. | July 26, 1932 |
| 2,495,817 | Olsen et al. | Jan. 31, 1950 |
| 2,979,632 | MacNeille | Apr. 11, 1961 |
| 2,992,586 | Upton | July 18, 1961 |
| 2,995,970 | Hicks et al. | Aug. 15, 1961 |
| 3,033,071 | Hicks | May 8, 1962 |